United States Patent [19]

Sawada et al.

[11] Patent Number: 5,469,769
[45] Date of Patent: * Nov. 28, 1995

[54] SOUNDBOARD FOR MUSICAL INSTRUMENTS

[75] Inventors: Shuichi Sawada; Katsuhiko Imagawa; Yoshihiko Murase, all of Shizuoka, Japan

[73] Assignee: Yamaha Corporation, Shizuoka, Japan

[*] Notice: The portion of the term of this patent subsequent to Nov. 28, 2008, has been disclaimed.

[21] Appl. No.: 371,601

[22] Filed: Jun. 26, 1989

Related U.S. Application Data

[63] Continuation-in-part of Ser. No. 43,048, Apr. 27, 1987, abandoned, which is a continuation-in-part of Ser. No. 647,982, Sep. 6, 1984, abandoned.

[51] Int. Cl.$^6$ ..................................................... G10C 3/06
[52] U.S. Cl. .................................................................. 84/193
[58] Field of Search ........................................... 84/192–193

[56] References Cited

U.S. PATENT DOCUMENTS

| | | | |
|---|---|---|---|
| 2,674,912 | 4/1954 | Petek | 84/291 |
| 4,248,124 | 2/1981 | Klaiber et al. | 84/192 |
| 4,337,682 | 7/1982 | Schwichtenberg | 84/193 |
| 4,348,933 | 9/1982 | Kamah et al. | 84/193 |
| 4,969,381 | 11/1990 | Decket et al. | 84/291 |

OTHER PUBLICATIONS

Lapedes, D. N., McGraw Hill Dictionary of Scientific and Technical Terms, 1974, p. 871.
Singer, F. L. and Pytel, A., Strength of Materials, 1980, pp. 39, 40.
Rosen, B., Fracture Processes in Polymeric Solids, 1964, pp. 86, 87.
Hashin, Z., Vibration Analysis of Viscollastic Bodies with Small Loss Tangents, International Journal of Solids and Structures, 1977, vol. 13, No. 6, p. 551.
Paipetis, S. A., & Grootenhuis, P., The Dynamic Properties of Fiber Reinforced Viscoelastic Composites, Fibre Science & Technology vol. 12, No. 5, pp. 354–365.

Primary Examiner—Lawrence R. Franklin
Attorney, Agent, or Firm—Sachs & Sachs

[57] ABSTRACT

In a laminated construction of a soundboard for use in musical instruments such as the piano, the use of a core having larger shearing elastic modulus and/or smaller shearing loss tangent than that of the fore and rear plates assures small shearing loss in the treble range, and greatly improves the total tonal balance over the entire tonal range.

12 Claims, 4 Drawing Sheets

SOUNDBOARD FOR MUSICAL INSTRUMENTS

Cross Reference to Related Application

This application is a continuation in part application of Ser. No. 07/043,048 filed Apr. 27, 1987, now abandoned, which was a continuation in part of application Ser. No. 647,982 filed Sep. 6, 1984 which was abandoned.

BACKGROUND OF THE INVENTION

The present invention relates to an improved soundboard for musical instruments, and more particularly to an improved construction of a laminated soundboard used for stringed musical instruments such as pianos.

In producing the acoustic effect of a stringed musical instrument such as a piano, a soundboard plays a very important role in amplifying the vibration of the strings and the generation of the musical tones. The operational characteristics of the soundboard have a great influence on tone quality and volume and the envelope of musical tones generated by the piano. It can be safely said that the soundboard is a key factor in determining the quality of performance of a piano.

To exhibit high performance characteristics, a soundboard is required to have low specific gravity, highly elastic behavior, little absorption of vibration energy, and uniform resonance characteristics from the bass to the treble range.

Woods such as silver fir or spruce have been used for the production of soundboards. The use of such natural materials, however, leads to high production costs and complicated manufacturing steps. In addition, since the modular ratio, $E/\rho$ or specific Young's modulus, i.e., the value of Young's modulus of a material divided by the density of the material of the soundboard being manufactured, is unavoidably restricted to the values special to woods, there is an inherent limit to the capacity of the wooden soundboard to generate musical tones.

In order to avoid the expenses and limitations of wooden soundboards, laminated soundboards have been proposed which utilize a core material of low specific gravity such as foam plastic upon which is bonded wooden face plates. Soundboards of this construction, however, due to the low shearing elastic modulus (G) of the core and large shearing loss tangent, exhibit poor sound production at high frequencies, low tone volume, and as a result, a poor envelope of musical tones is generated. Thus, no beautiful tonal balance can be expected. The shearing loss tangent is the measure of energy lost in the conduction of shearing deformations generated at a certain frequency through a soundboard. The shearing loss tangent is a measure of the attenuation of energy or the damping effect of the conducting media on vibrations of a certain frequency. The shearing loss tangent is equal to the ratio of shearing loss modulus with respect to shearing storage modulus.

Laminate soundboard constructions using wood for the core also exhibit relatively low modular ratio and large internal loss, and thus share the poor quality sound production characteristics of plastic core soundboards known in the art.

SUMMARY OF THE INVENTION

It is the object of the present invention to provide a soundboard for musical instruments which produces sustained, high volume musical tones from bass to treble range with excellent tonal balance.

In accordance with the basic aspect of the present invention, a core made of a material with either larger shearing elastic modulus and/or smaller shearing loss tangent is interposed between fore and rear plates.

DESCRIPTION OF THE PREFERRED EMBODIMENT

Figure 1:
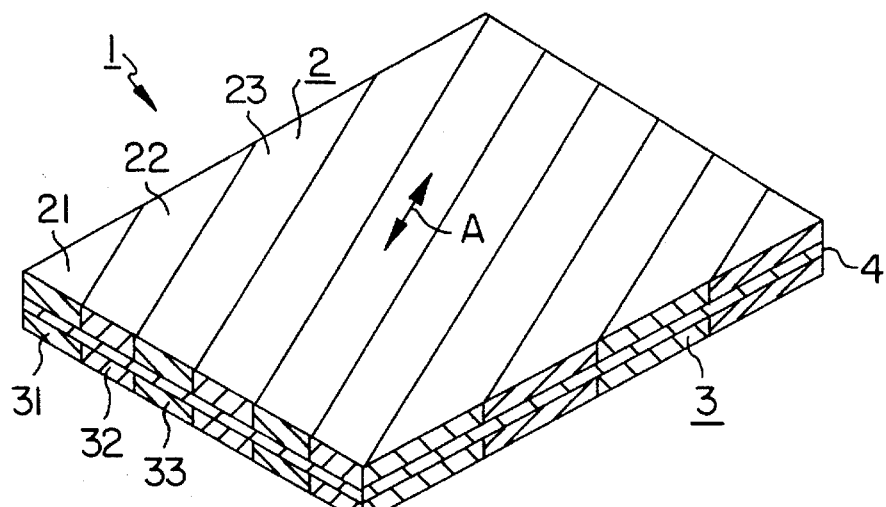
FIG. 1 is a fragmentary perspective view of one embodiment of the soundboard in accordance with the present invention.

The basic construction of one embodiment of the soundboard in accordance with the present invention is shown in FIG. 1, in which a soundboard 1 is made up of a core 4, a fore plate 2 bonded to one surface of the core 4 and a rear plate 3 bonded to another surface of the core 4.

In the case of the illustrated embodiment, the fore plate 2 includes a number of strips 21, 22, 23 and so on which are combined side-by-side with each other with their grains running in the same direction shown by arrow A. The rear plate 3 has a similar construction in which a number of strips 31, 32, 33 and so on are combined side-by-side with their grains running in the same direction. Grain directions in the fore and rear plates 2 and 3 are preferably the same. Further preferably, the fore and rear plates 2 and 3 have equal thickness such as 4 mm when the core 4 has a thickness of 2 mm.

The core 4 should be made of a material whose shearing elastic modulus (G) is larger than those of the fore and rear plates 2 and 3 or whose shearing loss is smaller than that of the fore and rear plates 2 and 3. More preferably, the core 4 should be made of a material whose shearing elastic modulus (G) is larger than and whose shearing loss is smaller than that of the fore and rear plates 2 and 3. The shearing elastic modulus (G) of the core should not exceed $3.0 \times 10^{11}$ dyne/$cm^2$. Typically, such material is chosen from woods such as western red cedar, padauk and "onoore kamba" (Betula Schmidtii), metals such as aluminum, magnesium and titanium, synthetics such as glass fiber-resin composites and graphite fiber-resin composites and ceramics. When wood is used for the core 4, its grain direction should preferably be arranged in parallel to those of the associated fore and rear plates 2 and 3.

Shearing elastic moduli and shearing loss tangents for spruce, padauk, western red cedar, aluminum and carbon fiber reinforced plastics are shown in the following Table.

|  | Shearing elastic modulus (G) dyn/cm$^2$ | Shearing loss tangent (tan δ G) |
| --- | --- | --- |
| spruce | 6.8 × 10$^9$ | 0.0219 |
| padauk | 1.44 × 10$^{10}$ | 0.0148 |
| aluminium | 2.9 × 10$^{11}$ | 0.0002 |
| graphite fiber-resin composites | 5.4 × 10$^{10}$ | 0.012 |
| western red cedar | 8.5 × 10$^9$ | 0.011 |

For the fore and rear plates 2 and 3, woods such as pine and cedar, and synthetics such as glass or graphite fiber-resin composites are advantageously usable.

Figure 2:
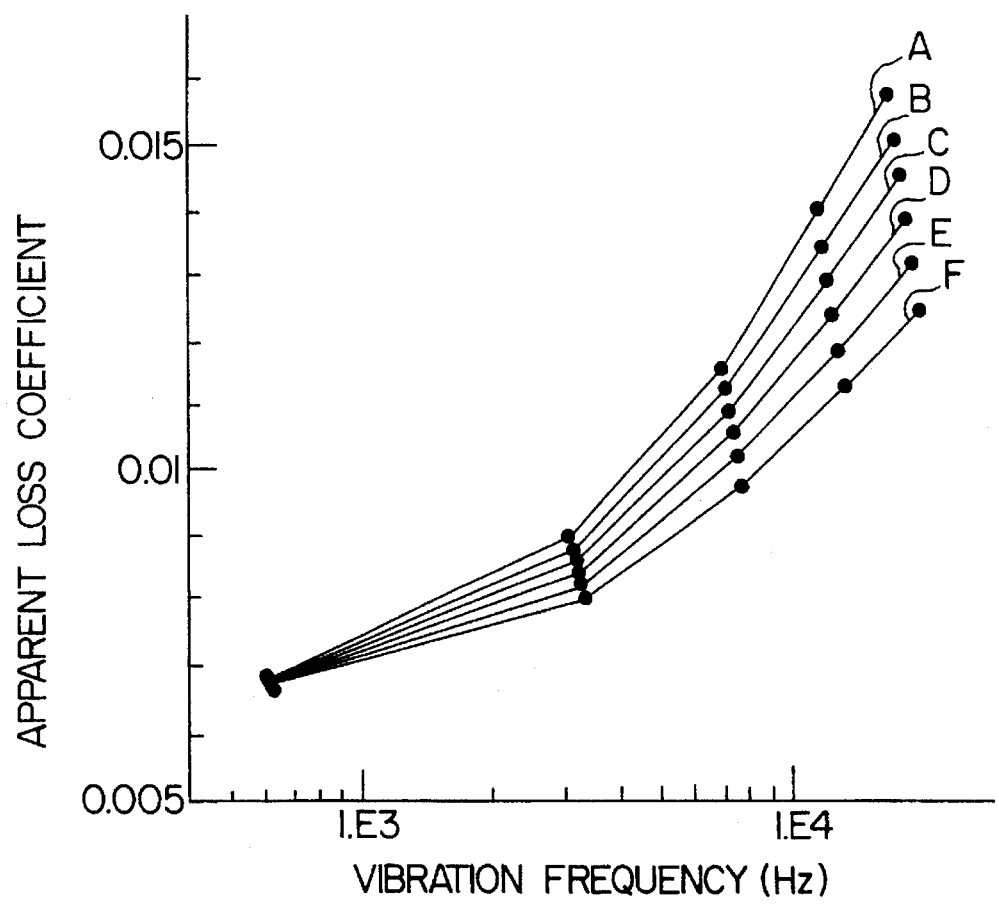
FIG. 2 is a graph for showing the relationship between apparent loss coefficient, the total vibration loss energy divided by the total vibration energy of the entire soundboard and multiplied by ½π, the total vibration loss energy being given by the sum of vibration loss energies of all small sections of the entire soundboard which is dissipated in the form of heat within one complete cycle of vibration, and vibration frequency for soundboards of various types.

Now referring to FIG. 2, the relationship between the apparent loss coefficient and vibration frequency is shown for various soundboards having core materials with various shearing elastic moduli.

More importantly, the graph depicts tests of soundboards in which the shearing elastic modulus of the core is varied relative to the shearing elastic modulus of the fore and rear plates.

Curve A shows a Sitka spruce soundboard for comparison. Curve B shows the loss characteristics over a frequency range for a soundboard in which the core has a shearing elastic modulus which is 10% greater than the shearing elastic modulus of the fore and rear plates of the soundboard. Curves C, D, E and F show the loss characteristics over a frequency range for soundboards in which the cores have shearing elastic moduli which are 20%, 30%, 40% and 50% greater than the shearing elastic moduli of the fore and rear plates of the soundboards.

Figure 3:
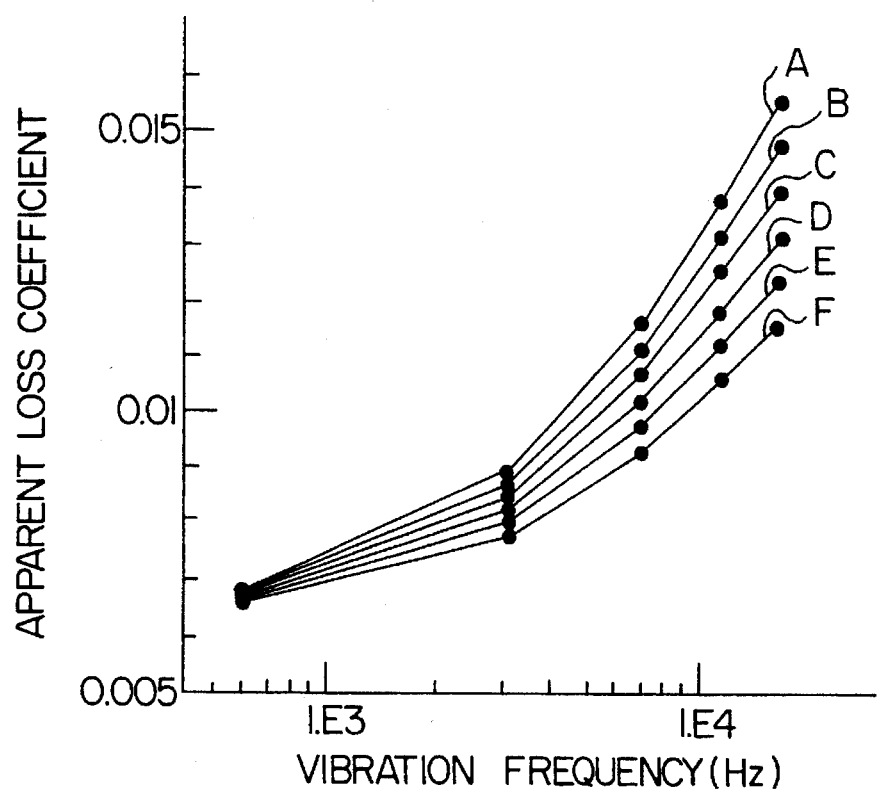
FIG. 3 is a graph for showing the relationship between apparent loss coefficient and vibration frequency for soundboards of various types.

Referring to FIG. 3, the relationship between the apparent loss coefficient and vibration frequency is shown for soundboards having core materials with various shearing loss tangent characteristics.

More importantly, the graph depicts tests of soundboards in which the shearing loss tangent of the core is varied relative to the shearing loss tangent of the fore and rear plates.

Curve A shows a Sitka spruce soundboard for comparison. Curve B shows the loss characteristics over a frequency range for a soundboard in which the core has a shearing loss tangent which is 10% less than the shearing loss tangent of the fore and rear plates of the soundboard. Curves C, D, E and F show the loss characteristics over a frequency range for soundboards in which the cores have shearing loss tangent characteristics which are 20%, 30%, 40% and 50% smaller than the shearing loss tangent characteristics of the fore and rear plates of the soundboards.

These technical data indicate that good results are obtained in the generation of musical tones by a soundboard where the shearing elastic modulus (G) of the material used for the core of the soundboard is 20% or more greater than that of the material used for the fore and rear plates or where the shearing loss tangent (tan δG) of the material used for the core is 20% or more less than that of the material used for the fore and rear plates. It was also confirmed that the best results are obtained when both the shearing elastic modulus (G) of the material used for the core is 20% or more greater than that of the material used for the fore and rear plates, and the shearing loss tangent (tan δG) of the material used for the core is 20% or more less than that of the material used for the fore and rear plates.

Figure 4:
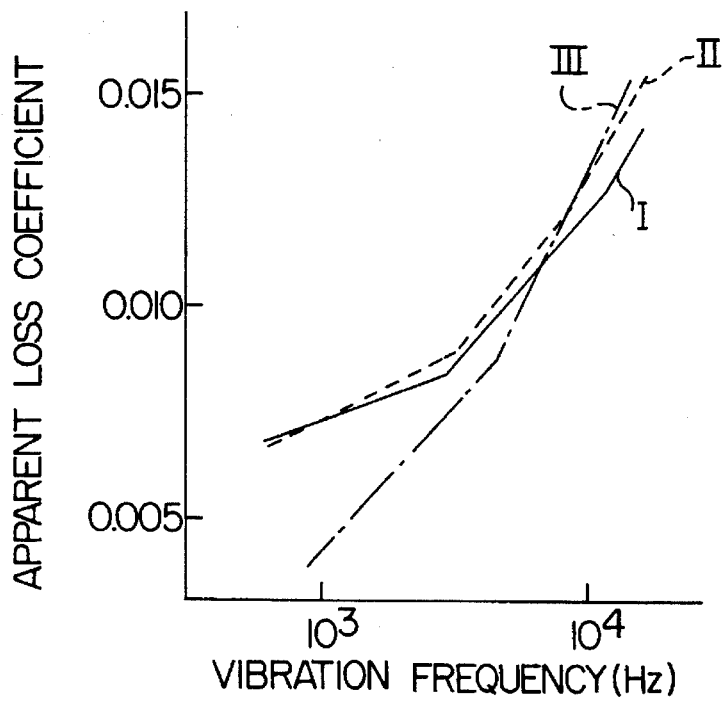
FIG. 4 is a graph for showing the relationship between apparent loss coefficient and vibration frequency for soundboards of various types.

FIG. 4 shows the relationship between the apparent loss coefficient and vibration frequency for various types of soundboards. Curve I corresponds to a soundboard constructed in accordance with the principles of the present invention such as shown in FIG. 1, which utilizes a padauk core of 2 mm thickness and spruce fore and rear plates each of 4 mm thickness, the total thickness of the soundboard being 10 mm. Curve II corresponds to a soundboard of 10 mm total thickness which is made solely of spruce. Curve III corresponds to a soundboard of 10 mm total thickness which includes a spruce core of 9.5 mm thickness and graphite fiber-resin composite fore and rear plates each of 0.25 mm thickness.

It has been learned from the above technical data that the soundboard of the present invention (Curve I) exhibits a smaller apparent loss coefficient in the high frequency range, compared with the soundboard constructed solely of spruce (Curve II). The musical tones thus produced have extended envelopes in the treble range and, as a consequence, the musical tones are generated with excellent total tonal balance.

The data further indicates that the use of a spruce core having a small shearing elastic modulus (G) in combination with graphite fiber-resin composite fore and rear plates having a large elastic modulus (E) as in Curve III, results in slightly smaller shearing loss in the bass range (musical tone frequencies from 20 Hz to 4 kHz) but larger shearing loss in the treble range (frequencies greater than or equal to 5 kHz). Such large shearing loss in the treble range destroys the tonal balance over the entire tonal range.

Further, the desired acoustic characteristics can be obtained by properly adjusting the thickness of the core 4 in the construction of the soundboard 1.

Figure 5:
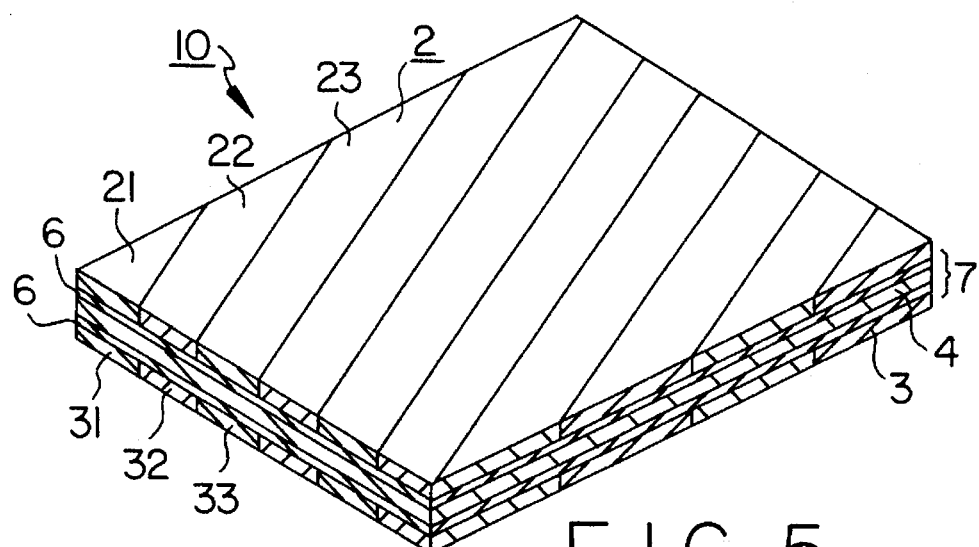
FIG. 5 is a fragmentary perspective view of another embodiment of the soundboard in accordance with the present invention.

Another embodiment of the soundboard in accordance with the present invention is shown in FIG. 5, in which a soundboard 10 includes an aggregate core 7 and fore and rear plates 2 and 3, the same as those shown in FIG. 1. The aggregate core 7 used herein includes a core 4, the same as that shown in FIG. 1, but also includes a pair of additional laminae 6 attached to the fore and rear surfaces of the core 4. The additional laminae 6 are made of glass or graphite fiber-resin composites, metal, wood or ceramics. Alternatively, the aggregate core 7 may be composed of a lamination of two or more layers of core material 4 with alternating layers of laminae 6 composed of the aforementioned materials.

Figure 6:
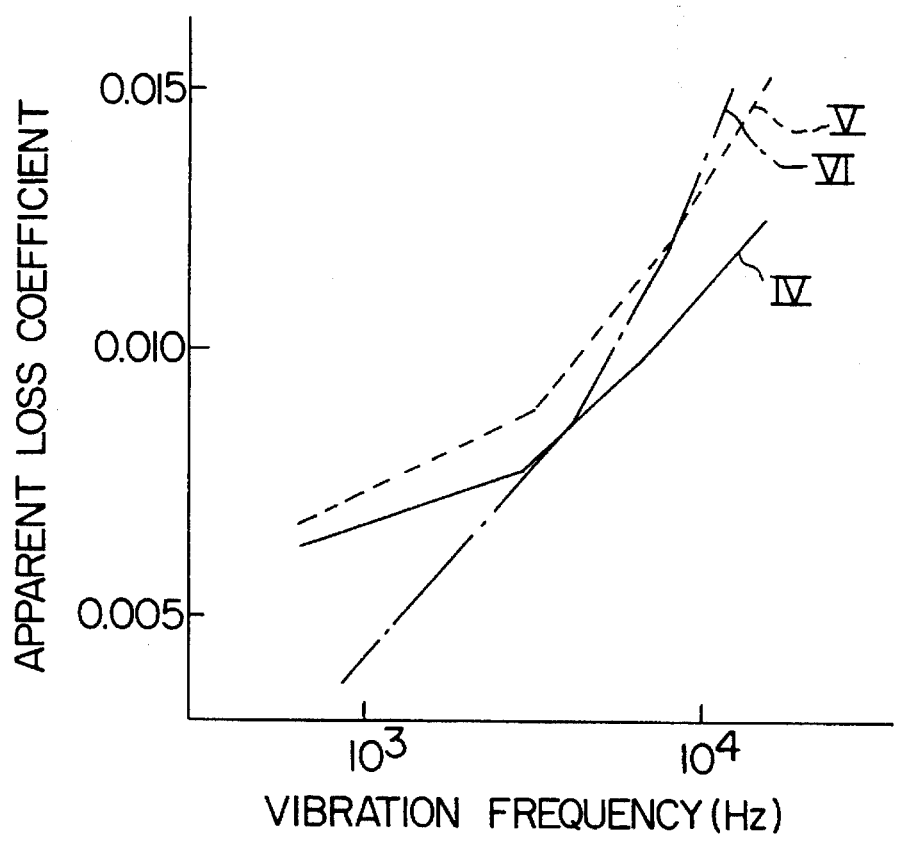
FIG. 6 is a graph for showing the relationship between apparent loss coefficient and vibration frequency for soundboards.

FIG. 6 shows the relationship between apparent loss coefficient and vibration frequency for various types of soundboards. Curve IV corresponds to a soundboard constructed in accordance with the principles of the present invention such as shown in FIG. 5 which utilizes a western red cedar core of 2 mm thickness, two graphite fiber-resin composite laminae each of 0.25 mm thickness and spruce fore and rear plates each of 3.75 mm thickness, the total thickness of the soundboard being 10mm. Curve V corresponds to a soundboard of 10 mm total thickness which is made solely of spruce. The Curve VI corresponds to a soundboard of 10 mm total thickness which includes a spruce core of 9.5 mm thickness and a pair of graphite fiber-resin composite laminae, each of 0.25 mm thickness bonded to different surfaces of the spruce core.

It has been learned from the above technical data that the soundboard of the present invention (Curve IV) exhibits a smaller apparent loss coefficient over the entire frequency range shown when compared with the soundboard constructed solely of spruce (Curve V). The musical tones thus produced have extended envelopes over the entire tonal range and, in particular, in the treble range. As a consequence, the musical tones that are generated exhibit excellent total tonal balance. In the case of the soundboard of Curve VI, large shearing loss is observed in the treble range despite its remarkably small shearing loss in the bass range leading to poor total tonal balance.

Figure 7A:
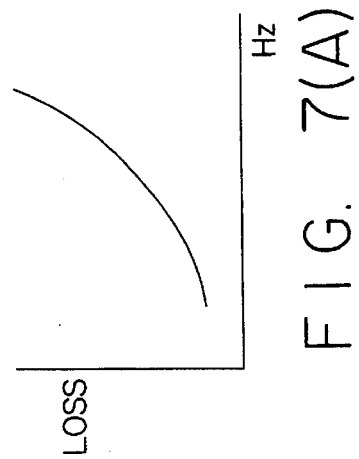
FIG. 7 shows three graphs labelled (A), (B) and (C) which show the relationship between apparent loss tangent and vibration frequency for three different soundboards.
Figure 7B:
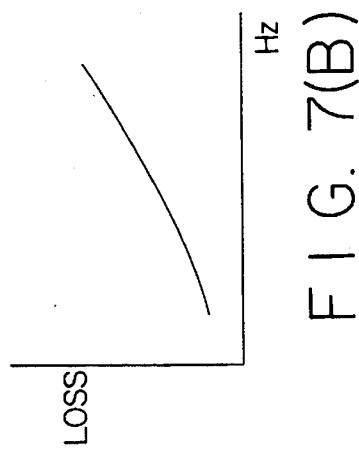
Figure 7C:
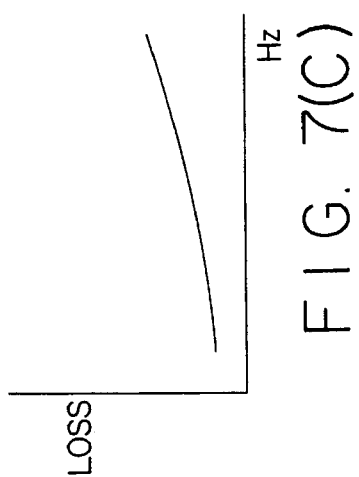

FIG. 7 further illustrates the relationship between losses of vibrational energy at particular frequencies in soundboards of different constructions.

In the case of the soundboard, the performance characteristics of which are shown in Graph A, there is a large apparent loss tangent in the high frequency range. Thus, there is little resonance of the soundboard at high frequencies and the board sustains only low frequency musical tones. This leads to what might be characterized as a "dark" or "dull" sound throughout the range of the musical instrument.

Graph C shows a soundboard which exhibits very little apparent loss tangent in the high frequency range and concurrently strong resonance of high frequency tones and overtones. This type of soundboard generates musical tones which might be described as "shrill" or "sharp."

The performance characteristics shown in Graph B are an object of the present invention. Graph B shows moderate apparent loss tangent over the operational frequency range and a balanced resonance of high and low frequencies. This type of soundboard generates musical tones throughout the range of the musical instrument which could be described as "mellow" or "balanced."

It should be noted that the soundboard of the present invention is appropriate for use in other musical instruments such as guitars, as well as, pianos.

We claim:

1. An improved soundboard for musical instruments comprising fore and rear plates, and a core interposed between and bonded to said fore and rear plates and made of a material with a shearing elastic modulus greater than that of said fore and rear plates and with a shearing loss tangent that is less than that of said fore and rear plates, said shearing elastic modulus of said material for said core being less than 3.0×10 dyne/cm.

2. An improved soundboard for musical instruments comprising fore and rear plates, and a core interposed between and bonded to said fore and rear plates and made of a material with a shearing elastic modulus greater than that of said fore and rear plates and with a shearing loss tangent that is less than that of said fore and rear plates.

3. An improved soundboard as claimed in claim 1 or 2 wherein said core is made of a material which is chosen from the group consisting of western red cedar, onoore kamba, aluminum, magnesium, titanium, graphite fiber-resin composites, glass fiber-resin composites and ceramics.

4. An improved soundboard as claimed in claim 1 or 2 in which said shearing elastic modulus of said material for said core is 20% or more greater than that of said material for said fore and rear plates.

5. An improved soundboard as claimed in claim 4 in which said core is accompanied by at least one lamina made of a material chosen from a group consisting of woods, metals, ceramics, graphite fiber-resin composites and glass fiber-resin composites.

6. An improved soundboard as claimed in claim 4 in which said core is made of a material which is chosen from the group consisting of western red cedar, onoore kamba, aluminum, magnesium, titanium, graphite fiber-resin composites, glass fiber-resin composites and ceramics.

7. An improved soundboard as claimed in claim 6 in which said shearing loss tangent of said material for said core is 20% or more less than that of said material for said fore and rear plates.

8. An improved soundboard as claimed in claim 1, or 2 in which said core is accompanied by at least one lamina made of a material chosen from a group consisting of woods, metals, ceramics, graphite fiber-resin composites and glass fiber-resin composites.

9. An improved soundboard as claimed in claim 8 in which a pair of laminae are attached to different surfaces of said core.

10. An improved soundboard as claimed in claim 8 in which said lamina is attached to said core as an intermediate layer.

11. An improved soundboard as claimed in claim 1 or 2 in which said materials for said core is chosen from the group consisting of spruce, pine and cedar, graphite fiber-resin composites and glass fiber-resin composites.

12. An improved soundboard as claimed in claim 2, in which said shearing loss tangent of said material for said core is 20% or more less than that of said material for said fore and rear plates.

* * * * *